ELECTROPHORETIC TREATMENT OF PHOTO-RESIST FOR MICROCIRCUITY

Filed Nov. 23, 1964

WITNESSES
Edwin E. Bassler
James F. Young

INVENTORS
Irving F. Barditch &
Charles J. Taylor
BY Gordon H. Telfer
ATTORNEY

United States Patent Office 3,423,262 Patented Jan. 21, 1969

3,423,262

ELECTROPHORETIC TREATMENT OF PHOTO-RESIST FOR MICROCIRCUITY

Irving F. Barditch and Charles J. Taylor, Baltimore, Md., assignors to Westinghouse Electric Corporation, Pittsburgh, Pa., a corporation of Pennsylvania Filed Nov. 23, 1964, Ser. No. 413,300
U.S. Cl. 156—13 4 Claims
Int. Cl. B01k 5/00; C23f 1/02; H01l 7/00

ABSTRACT OF THE DISCLOSURE

Electrophoretic treatment of photo-resist materials to remove a sludge so the resulting solution can be used to form high resolution masks such as for use in making microcircuits.

This invention relates generally to the purification of any liquid containing an undesired suspension of particles and more particularly to the electrophoretic treatment of photo-resist in order to remove undesired particles and dispersed sludge.

Photoengraving is important in the manufacture of semiconductor devices such as diodes, transistors and microelectronic blocks. One of the major deterrents to producing high resolution semiconductor devices by this method has been the inability to produce very fine lines with an acid resistant film capable of meeting all the processing requirements for producing an etched semiconductor.

The photo-resists, that is, the materials used to form etch resistant patterns, presently commercially available are deficient in one or more essential characteristics. In general photo-resists presently on the market do not possess a resolution capability for producing line widths of 0.0001 inch while maintaining smooth line edges which is important in order to result in minimum electrical noise. In addition, the use of photo-resists presently on the market results in pin holes and these photo-resists are not capable of withstanding low surface tension or highly corrosive etches such as buffered hydrofluoric acid without undercutting or lifting at the edges of the film.

In view of the foregoing, the primary object of the present invention is to provide a method and apparatus for treating photo-resists such that the resulting photo-resists will be capable of producing high resolution semiconductor devices.

A further object of the present invention is to provide a method and apparatus for treating photo-resist to produce a photo-resist that will not cause pin holes and which is physically tougher and has improved adherence as compared to photo-resists presently commercially available.

Another object of the present invention is to provide a method and apparatus for treating photo-resist which will result in a photo-resist that eliminates undercutting and which will allow a wide latitude in exposure time such that exposure time is not critical.

Yet another object of the present invention is to provide a method and apparatus for treating photo-resist which will result in a photo-resist that permits projecion printing.

Other objects are to provide a photo-resist material that permits a shorter bake and a shorter, and more efficient, clean-up than previously.

Figure 1:
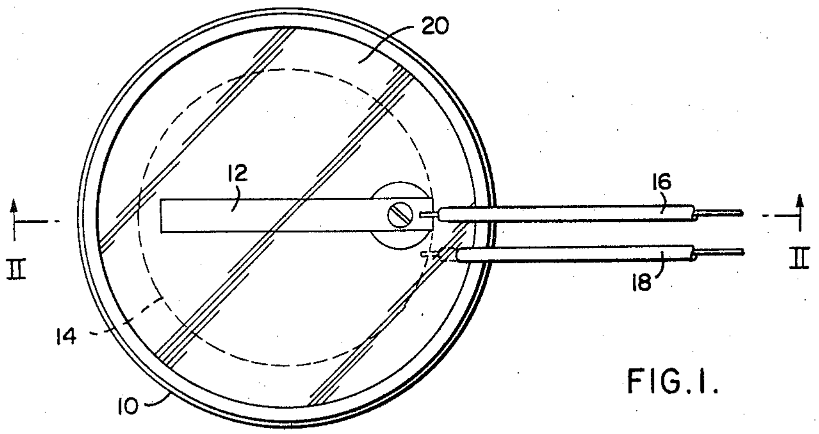
Figure 2:
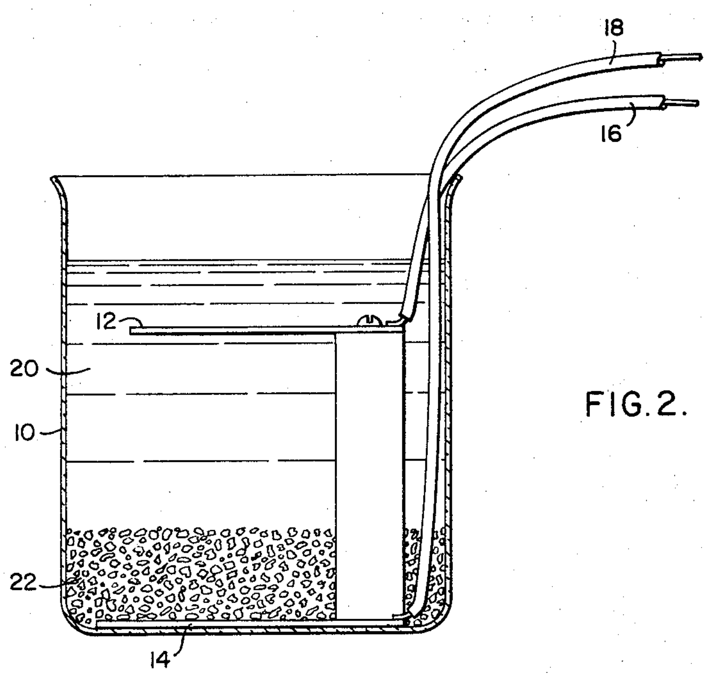

FIGS. 1 and 2 are, respectively, plan and sectional views of an example of apparatus with which the invention can be practiced, FIG. 2 being taken along line II—II of FIG. 1.

The present invention therefore provides a method for modifying existing photo-resists in order to produce a material which will satisfactorily produce very fine lines and meet the other requirements itemized above. Briefly stated, the present invention involves the electrophoretic treatment of a phoo-resist in order to remove unknown particles and dispersed sludge which it has been found causes pin holes, rough lines, serious undercutting, scalloped edges, etc. In accordance with the present invention, referring to the drawing, the photo-resist material is placed in a tank 10 in which are immersed two electrodes 12 and 14 made of a relatively inert or inactive material such as platinum or nickel. A voltage of from 3 to 20 kilovolts is applied by leads 16 and 18 through the material, for an electrode spacing of about 2 inches, for a period of from about 5 to 100 hours. This results in the separation of the photo-resist into a clear amber liquid 20 and a gelatinous sludge 22 which falls to the bottom of the container. The photo-resist which has been untreated would not pass through a 8 micron filter whereas after treatment the clear amber liquid will pass through a one micron filter. That is, the maximum particle diameter in the treated resist material is less han 1 micron while that in the untreated material is found to be at least 8 microns.

Phoo-resist materials that may be improved by treatment in accordance with the present invention include those comprising an organic solvent, an organic solvent-soluble material that is polymerizable such as a rubber, and a sensitizer. United States Patent No. 2,852,379, should be referred to for further information on such materials including their composition, preparation and use.

One such photo-resist that has been successfully treated with the method of the present invention is a photo-resist manufacured by the Eastman Kodak Company and sold under the name Kodak Metal Etch Resist or KMER. This photo-resist is believed to be basically a butadiene-styrene rubber compound in a solvent with a photo-sensitive activator suspended therein.

One of the basic difficulties with photo-resists is that they are not homogeneous and contain several species of material in suspension. In addition, the suspended material is polymerized to varying degrees and reacts differently to light. It has been found that the impurities in photo-resists cannot be removed by ball milling. Ball milling, although resulting in a smoother photo-resist with a reduction in the size of the gelatinous matter, also resulted in a more serious pin holing problem.

In accordance with the present invention, suspended particles and dispersed sludge are removed from the photo-resist prior to use by the application to the photo-resist of a strong electric field. The application of a high voltage electric field to the photo-resist causes unwanted material in the photo-resist to collect as a sludge layer 22 on the bottom of the treatment tank 10. The reason for this is that the unwanted materials apparently have electrical charges on them. Through the utilization of the electric field, the suspended particles and dispersed sludge are neutralized and accordingly fall to the bottom of the treatment container.

As stated above, the electrodes 12 and 14 may be of any conductive material, such for example, as platinum or nickel, but are preferably made of a metal which is relatively inert or inactive. The preferred voltage is three to twenty kilovolts applied to the photo-resist with the electrodes about two inches apart. It has been found that if voltages higher than twenty kilovolts are used, there is a tendency to remix the material and not separate out the unwanted material, while if the voltage is lower than three kilovolts either nothing happens or the time required to obtain a separation is extremely large. Other suitable fields can be provided by electrodes spaced other than two inches apart. An electric field of from one and a half kilovolts per inch to 10 kilovolts per inch is suitable.

The time period during which the electrophoretic treatment is carried out is variable. As little as 5 hours of treatment may provide marked improvement. As much as 100 hours or more may be worthwhile for maximum improvement. Generally, it is desirable to test sample quantities of the photo-resist material to be treated to see the maximum magnitude of electric field that can be used without the remixing referred to above. The treatment time is shorter with higher field, so long as remixing does not occur. While the process cannot be absolutely optimized because of variations in photo-resist materials, about 72 hours at about 5 kilovolts per inch are typically suitable conditions that have been used on the above described KMER.

Following the electrophoretic treatment, the photo-resist material may be applied to a layer of material on which an etch resistant pattern is desired, exposed through an optical mask (using radiation in the waveband which polymerizes it) and developed (using a solvent to remove unpolymerized material). These operations may be performed as with untreated photo-resists.

The photo-resist material treated as described herein also provides significant advantages during the bake cycle and clean-up operations. The bake cycle follows development of the etch resistant pattern and is for the purpose of completing the polymerization process by heat. With an untreated photo-resist, a bake cycle of about 20 to 30 minutes is usually required for a high resolution pattern. Now a time of only from about 5 to 15 minutes is required. In each case, the bake cycle temperature is about 240° F., that is, about as high a temperature as the photo-resist material can stand without carbonization.

The clean-up operation is that performed after etching to remove the etch resistant pattern. While previous treatment with a strong acid such as chromic acid was required for about 30 minutes, and still some particles of photo-resist would remain, excellent clean-up can now be achieved using concentrated sulfuric acid heated to a temperature of from about 180° C. to 200° C. on the photo-resist for a time of only about 5 to 10 minutes.

It has been found that the photo-resist after treatment as set forth is approximately seventy-five percent by volume of the original photo-resist. The photo-resist after treatment is capable of passing through a one micron filter without clogging while the original photo-resist would not pass through a 8 micron filter without clogging the pores.

The treated photo-resist has a much higher transmission to short wave lengths illustrating that the sludge or polymerized gelatinous material is the source of the undesired characteristics of the untreated photo-resist. Tests conducted on the treated photo-resist show that it is capable of resolving line widths of 0.0001 inch and is capable of withstanding a buffered hydrofluoric acid etch through 10,000 angstroms of silicon dioxide with no measurable amount of undercutting for a period of approximately fifteen minutes.

What has been described is a method for treating photo-resist containing unknown particles and dispersed sludge to obtain a clear amber photo-resist material which does not contain any undesired particles or dispersed sludge and which is capable of passing through a one micron filter. The resultant photo-resist eliminates pin holes and has other properties which tre desirable in a photo-resist used in the manufacture of semiconductor devices.

While the present invention has been described in a few forms only, it will be understood that some modifications may be made without departing from the spirit and scope thereof.

We claim as our invention:

1. A method of forming an etch resistant mask on a semiconductor substrate comprising the steps of: obtaining a quantity of photo-resist solution consisting essentially of a butadiene-styrene rubber compound in an organic solvent with an organic photosensitive activator suspended therein; placing said quantity of photo-resist solution in a container; providing a pair of electrodes in said quantity of photo-resist solution and applying a field of from about 1.5 to about 10 kilovolts per inch across said electrodes for at least 5 hours to cause formation of a clear liquid and a sludge material by electrophoresis; applying said clear liquid to said layer of material and exposing and developing it to form a pattern of high resolution and good adherence; applying an etchant to said layer through said pattern to achieve etching of said layer without substantial undercutting of said layer.

2. A method in accordance with claim 1 wherein: following said exposing, said photo-resist material is baked at a temperature not greater than about 240° F. for a time not greater than about 15 minutes to complete polymerization of said material.

3. A method in accordance with claim 1 wherein: following said etching, said pattern is removed by applying for a time of about 5 to 10 minutes concentrated sulfuric acid heated to a temperature of from about 180° C. to 200° C.

4. A method in accordance with claim 1 wherein said etchant is buffered hydrofluoric acid and said layer of material is of silicon dioxide.

References Cited

UNITED STATES PATENTS

| | | | |
|---|---|---|---|
| 2,900,320 | 8/1959 | Metcalf et al. | 204—300 |
| 2,995,503 | 8/1961 | Warner | 204—180 |
| 3,256,168 | 6/1966 | Heller | 204—165 |

JACOB H. STEINBERG, *Primary Examiner.*

U.S. Cl. X.R.

96—91; 115, 36.2; 156—17; 204—180, 184